UNITED STATES PATENT OFFICE.

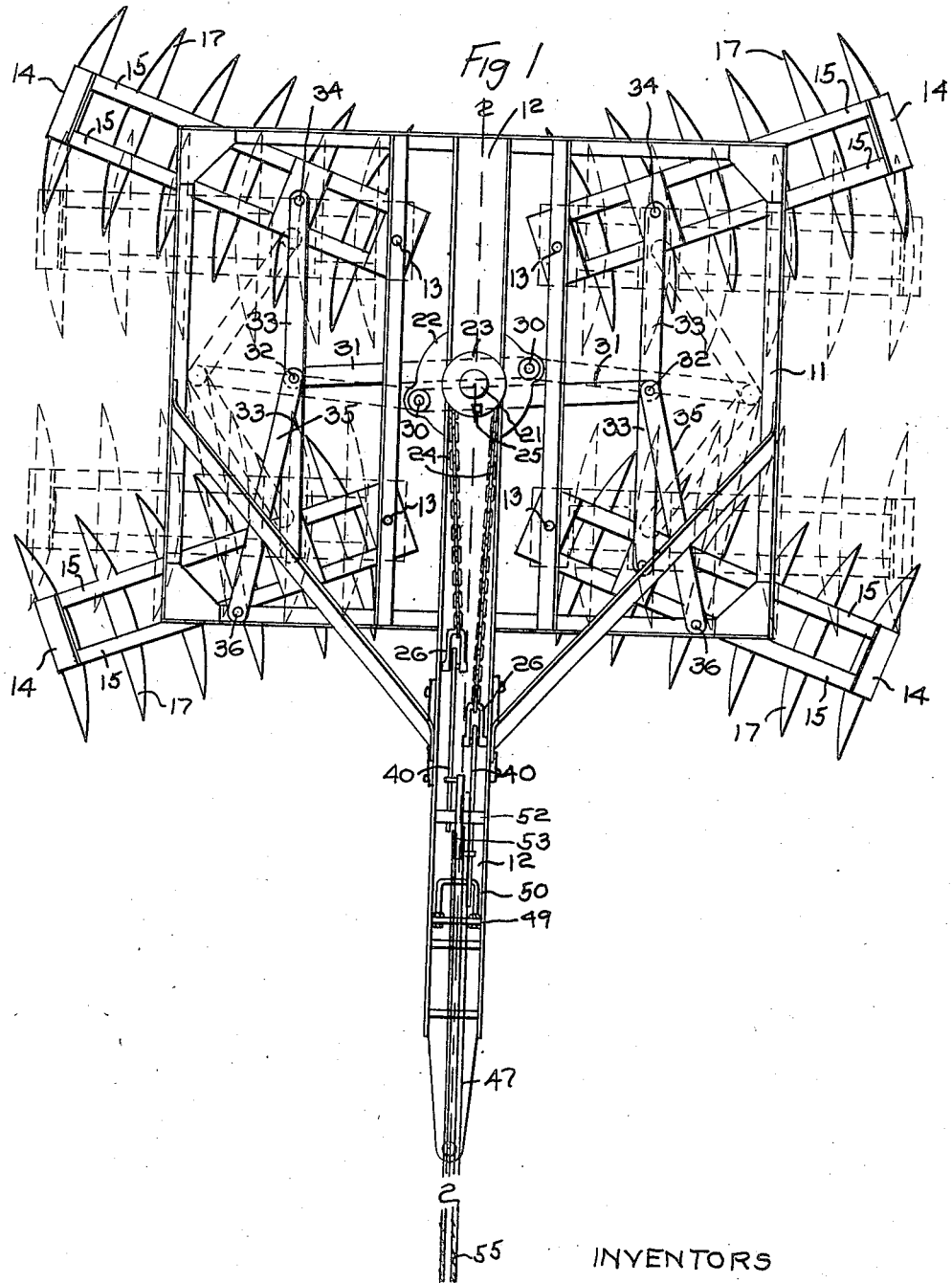

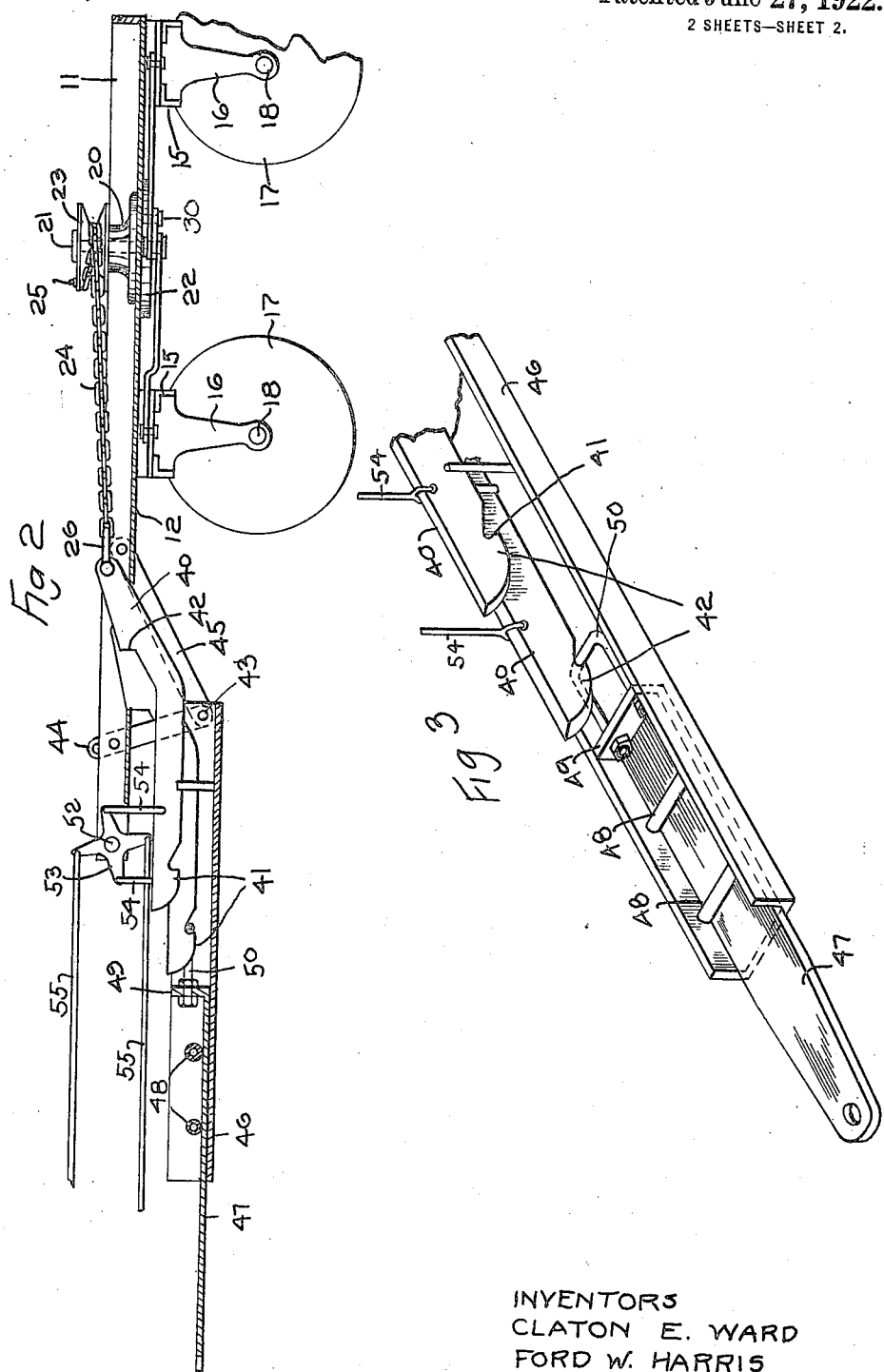

CLATON E. WARD, OF OXNARD, AND FORD W. HARRIS, OF LOS ANGELES, CALIFORNIA, ASSIGNORS TO BRENNEIS MANUFACTURING COMPANY, A CORPORATION OF CALIFORNIA.

TANDEM DISK HARROW.

1,421,048.

Specification of Letters Patent.   Patented June 27, 1922.

Application filed December 3, 1919. Serial No. 342,241.

*To all whom it may concern:*

Be it known that we, CLATON E. WARD and FORD W. HARRIS, both citizens of the United States, the former residing at Oxnard, in the county of Ventura, State of California, the latter residing at Los Angeles, in the county of Los Angeles, State of California, have invented a new and useful Improvement Comprising Tandem Disk Harrows, of which the following is a specification.

Referring to the drawing which is for illustrative purposes only,

Fig. 1 is a plan view of the harrow showing the parts in their operative position the inoperative position being shown in dotted lines.

Fig. 2 is an elevation partly in section on the line 2—2 of Fig. 1 showing the draft gear.

Fig. 3 is a perspective view of the draft device.

In the embodiment of the invention shown, a frame 11 is provided, this frame having a central channel 12. Pivoted to the frame 11 at points 13 are four implement gangs 14 each of these gangs consisting of a frame 15 and a plurality of bearings 16 carrying shafts 18 on which disks 17 are free to turn. Secured in the channel 12 is a casting 20 and turning in the casting 20 is a shaft 21 which carries a crank plate 22 on its lower end. Secured to the upper end of the shaft 21 is a sheave wheel 23 around which a chain 24 passes. The chain 24 is secured by means of a bolt 25 to the wheel 23 and each end thereof passes forward to a separate clevis 26. Secured on the disk 22 are a pair of crank pins 30 which are located on the same diameter and at the same radius. Pivoted on the crank pins 30 are connecting rods 31, each of these connecting rods being pivoted at its outer end on a pin 32 which forms the common point for a toggle formed of links 33, these links being pivoted at their outer end to pins 34 carried on the gangs 14. Also secured to the pin 32 is a tension link 35 which is pivoted at 36 to the frame 11. The clevises 26 are each secured to a hook bar 40, these hook bars passing through openings in the channel 12 and having hooks 41 formed near the forward end thereof. The hook bars are also provided with shoulders 42 which strike against the channel and limit the forward motion of the hook bars. Pivoted on a pin 43 which is hung from links 44 and 45 pivoted to the channel 12 is a draft channel 46. Sliding in this channel is a draw bar 47. The draw bar 47 has a hole therein by which a tractor or other draft means may be attached. The draw bar 47 is guided by rollers 48 and is turned up at its inner end as shown at 49 to carry a U bolt 50. The U bolt 50 is so located that it can be readily caught by the hooks 41 of the bars 40. Turning on shaft 52 in the channel 12 is a star wheel 53, this wheel being connected by means of links 54 with the bars 40 and being provided with lines 55 which extend forwardly to the tractor and by which the wheel 53 is operated.

The method of operation is as follows:—

With the parts in the operative position as shown in full lines in Fig. 1 the line of motion of the harrow is along the line 2—2, the disks 17 being inclined to this line of motion. When it is desired to throw the disks into the dotted position for the purpose of moving the harrow the following procedure is adopted.

The tractor which is connected to the member 47 is backed up sliding the member 47 in the member 46 and moving the U bolt 50 from the position shown in Fig. 3 under the forward hook 41 into a position directly below or somewhat back of the rear hook 41. The driver of the harrow then manipulates the lines 55 to lift the forward hook 41 and drop the rear hook 41 to catch in the U bolt 50. Upon starting up the tractor the rear hook 41 is pulled forward pulling on the chain 24 and rotating the sheave wheel 23 and the crank pins 30 through approximately 180°. This pushes the links 33 from the position shown in full lines into the position shown in dotted lines pulling the points 34 inwardly until the disks 17 are parallel to each other so that the harrow can be readily transported. If it is desired to throw the gangs back to their inclined position the tractor is again backed up pushing the bolt 50 back and the rear hook 41 which is then dropped in place, the front hook being lifted. Upon again starting the tractor the sheave 23 is rotated in the opposite direction to that previously described and the links 33 are pulled back into their full line position.

We claim as our invention:—

1. A cultivator comprising a front pair of implement gangs; a rear pair of implement gangs; a frame; means for pivoting the inner end of each gang to said frame; a draft device; a sheave wheel; means by which said draft device can be used to rotate said sheave wheel in either direction; and means by which said rotation of said sheave wheel throws said gangs to and from the operative position.

2. A cultivator comprising a front pair of implement gangs; a rear pair of implement gangs; a frame; means for pivoting the inner end of each gang to said frame; a sheave wheel mounted on said frame; a chain passing around and secured to said sheave wheel; a draft device; means by which said draft device may be secured to either end of said chain; and means for utilizing the rotative movement imparted to said sheave wheel to throw said gangs to and from the operative position.

3. A cultivator comprising a front pair of implement gangs; a rear pair of implement gangs; a frame; means for pivoting the inner end of each gang to said frame; a sheave wheel mounted on said frame; a chain passing around and secured to said sheave wheel; a draft device; means by which said draft device may be secured to either end of said chain; four toggle bars each secured at their outer ends to one of said gangs and each secured at its inner end to another of said bars, forming two toggles located at either side of said sheave; and means by which the movement of said sheave sets said toggles to throw said gangs into the operative position or breaks said toggle to throw said gangs into mutually parallel relationship.

4. A cultivator comprising a front pair of implement gangs; a rear pair of implement gangs; a frame; means for pivoting the inner end of each gang to said frame; a sheave wheel mounted on said frame; a chain passing around and secured to said sheave wheel; a draft device; means by which said draft device may be secured to either end of said chain; four toggle bars each secured at their outer ends to one of said gangs and each secured at its inner end to another of said bars, forming two toggles located at either side of said sheave; two tension links each secured at one end to said frame and at the other end to the common point of one of said toggles; and means by which the movement of said sheave sets said toggles to throw said gangs into the operative position or breaks said toggle to throw said gangs into mutually parallel relationship.

5. A cultivator comprising a front pair of implement gangs; a rear pair of implement gangs; a frame; means for pivoting the inner end of each gang to said frame; a sheave wheel mounted on said frame; a chain passing around and secured to said sheave wheel; a draft device; means by which said draft device may be secured to either end of said chain; four toggle bars each secured at their outer ends to one of said gangs and each secured at its inner end to another of said bars, forming two toggles located at either side of said sheave; crank pins operating at a fixed crank radius about the axis of said sheave wheel by which they are operated; and two connecting rods each pivoted on one of said crank pins at one end and on the common point of one of said toggles on the other.

6. A cultivator comprising a front pair of implement gangs; a rear pair of implement gangs; a frame; means for pivoting each gang to said frame; a draft device; a sheave wheel; means by which said draft device can be used to rotate said sheave wheel in either direction; and means by which said rotation of said sheave wheel throws said gangs to and from the operative position.

7. A cultivator comprising a front pair of implement gangs; a rear pair of implement gangs; a frame; means for pivoting each gang to said frame; a sheave wheel mounted on said frame; a chain passing around and secured to said sheave wheel; a draft device; means by which said draft device may be secured to either end of said chain; and means for utilizing the rotative movement imparted to said sheave wheel to throw said gangs to and from the operative position.

8. A cultivator comprising a front pair of implement gangs; a rear pair of implement gangs; a frame; means for pivoting each gang to said frame; a sheave wheel mounted on said frame; a chain passing around and secured to said sheave wheel; a draft device; means by which said draft device may be secured to either end of said chain; four toggle bars each secured at their outer ends to one of said gangs and each secured at its inner end to another of said bars, forming two toggles located at either side of said sheave; and means by which the movement of said sheave sets said toggles to throw said gangs into the operative position or breaks said toggle to throw said gangs into mutually parallel relationship.

9. A cultivator comprising a front pair of implement gangs; a rear pair of implement gangs; a frame; means for pivoting each gang to said frame; a sheave wheel mounted on said frame; a chain passing around and secured to said sheave wheel; a draft device; means by which said draft device may be secured to either end of said chain; four toggle bars each secured at their outer ends to one of said gangs and each secured at its inner end to another of said bars, forming two toggles located at either side of said sheave; two tension links each secured at one end to said frame and at the other end to the common point of one of said toggles; and means by which the movement of said sheave sets said toggles to throw said gangs into the operative position or breaks said toggle to throw said gangs into mutually parallel relationship.

10. A cultivator comprising a front pair of implement gangs; a rear pair of implement gangs; a frame; means for pivoting each gang to said frame; a sheave wheel mounted on said frame; a chain passing around and secured to said sheave wheel; a draft device; means by which said draft device may be secured to either end of said chain; four toggle bars each secured at their outer ends to one of said gangs and each secured at its inner end to another of said bars, forming two toggles located at either side of said sheave; crank pins operating at a fixed crank radius about the axis of said sheave wheel by which they are operated; and two connecting rods each pivoted on one of said crank pins at one end on the common point of one of said toggles on the other.

In testimony whereof, we have hereunto set our hands at Los Angeles, California, this 28th day of November, 1919.

CLATON E. WARD.
FORD W. HARRIS.